United States Patent [19]
Villemin et al.

[11] Patent Number: 5,001,811
[45] Date of Patent: Mar. 26, 1991

[54] SYSTEM FOR DENECKING FOWL

[75] Inventors: Daniel Villemin, Chennevieres S/Marne; Janusz Plusa, Champigny sur Marne, both of France

[73] Assignees: Etablissements Arrive S.A., Saint Fulgent; Union Financiere Pour le Developpement de l'Economie Cerealiere* *Unigrains, Seine, both of France

[21] Appl. No.: 464,513
[22] Filed: Jan. 12, 1990

[30] Foreign Application Priority Data

Jan. 13, 1989 [FR] France ............................... 89 00570

[51] Int. Cl.$^5$ ............................................. A22C 21/00
[52] U.S. Cl. ..................................... 452/168; 452/64; 452/149
[58] Field of Search ............................... 17/11, 12, 52

[56] References Cited

U.S. PATENT DOCUMENTS

| 4,035,867 | 7/1977 | Meyn | 17/11 |
| 4,097,960 | 7/1978 | Graham et al. | 17/11 |
| 4,184,230 | 1/1980 | Fox et al. | 17/11 |
| 4,308,639 | 1/1982 | Van Mil | 17/11 |
| 4,418,444 | 12/1983 | Meyn et al. | 17/11 |
| 4,730,365 | 3/1988 | Simmons | 17/12 |
| 4,894,885 | 1/1990 | Markert | 17/11 |

Primary Examiner—Willis Little
Attorney, Agent, or Firm—Herbert Dubno; Andrew Wilford

[57] ABSTRACT

An apparatus for denecking a bird according to this invention has a generally U-shaped die having a forwardly open notch in which a bird neck is positioned, a punch complementary to the notch and engageable therethrough, and a ram or the like for pushing the punch through the notch and thereby cutting off the neck positioned in the notch. The die is generally flat and has a pair of arms defining the notch and the notch has a base lying between the arms and the arms extend downward at an acute angle to the horizontal from the base. The bird is held supine during denecking fixedly relative to a stationary support and a carriage is provided that carries the die, the punch, and ram that moves this punch. This carriage is displaceable horizontally on the support forward away and backward toward the bird. When pressed backward against the bird it presses the die backward against the bird at a base of the neck thereof. A controller is provided for detecting the pressure with which the die is engaging the bird and for triggering operation of the system when the pressure exceeds a predetermined limit. Thus the carriage is pushed against the bird and the punch is automatically advanced when the pressure sensor detects that the die is pressed with sufficient force against the bird to ensure a perfectly positioned cut.

9 Claims, 2 Drawing Sheets

SYSTEM FOR DENECKING FOWL

FIELD OF THE INVENTION

The present invention relates to an apparatus for preparing fowl in a meat-packing operation. More particularly this invention concerns a method of and apparatus for denecking a bird and a method of operating the apparatus.

BACKGROUND OF THE INVENTION

In the preparation of a large bird, in particular a turkey, for sale it is standard to cut the bird up after slaughter into several pieces. With a turkey it is standard to clean the bird by removing the viscera and then rinsing the animal. Then the animal is hung from a conveyor chain which moves it through a plurality of stations at which pieces are cut off it, it is deboned, and so on. Clearly this process requires a substantial amount of manual work and has the considerable disadvantage that the quality of the end product depends directly on the abilities of the people doing the various steps. Furthermore a normally significant amount of meat is left hanging on the carcass or lodged in cavities thereof. One of the standard operations is the removal of the neck from the bird, as this piece has relatively little meat and is normally applied only to the lowest uses. Thus this neck is cut off in a first stage at a location as low as possible on the animal, that is at the joint of the wings and the coracoids. This leaves the carcass frequently with a neck stub which reduces the value of the bird.

U.S. Pat. No. 4,656,692 describes an apparatus which holds a gutted animal body, typically a bird, to move it through the various stations in a meat-packing plant. The body is held in a fairly stable position so that removal of wings and legs and stripping of meat is much easier than in the prior-art system in which the bird is suspended by its head or neck. Since the neck is not used in this apparatus it is advantageous to remove it as the first step in processing the cleaned and gutted body.

OBJECTS OF THE INVENTION

It is therefore an object of the present invention to provide a system for denecking a bird in a meat-packing operation.

Another object is the provision of such an improved apparatus which automates the job of denecking the bird and that does so by removing the neck at the ideal location for further treatment of the body.

A further object is to provide an improved method of operating such an apparatus.

SUMMARY OF THE INVENTION

An apparatus for denecking a bird according to this invention has a generally U-shaped die having a forwardly open notch in which a bird neck is positioned, a punch complementary to the notch and engageable therethrough, and a ram or the like for pushing the punch through the notch and thereby cutting off the neck positioned in the notch.

Thus with this system the bird is held in a supine position with its neck draped over the die and hanging down through the notch thereof so that the punch can accurately cut out the neck at the very base thereof. According to the invention the die is generally flat and has a pair of arms defining the notch and the notch has a base lying between the arms with the arms extending downward at an acute angle to the horizontal from the base. This ensures that the neck is cut off at a right angle to itself, since the pendant neck will be perpendicular to the base of the notch where it passes therethrough.

The position of the die and punch are determined by the V-shaped hollow formed by the coracoidal bones. The punch moves into the base of this V-shaped hollow so that the neck is cut off at its very base. This makes subsequent working on the bird much easier as the nearly useless neck is completely eliminated.

In accordance with further features of this invention the bird is held supine during denecking relative to a stationary support and a carriage is provided that carries the die, the punch, and the ram that moves this punch. This carriage is displaceable horizontally on the support forward away and backward toward the bird. When pressed backward against the bird it presses the die backward against the bird at a base of the neck thereof. A controller is provided for detecting the pressure with which the die is engaging the bird and for triggering operation of the system when the pressure exceeds a predetermined limit. Thus the carriage is pushed against the bird and the punch is automatically advanced when the pressure sensor detects that the die is pressed with sufficient force against the bird to ensure a perfectly positioned cut.

The carriage according to this invention can be pivotal about an axis transverse to the direction of displacement of the carriage, under the control of a fluid-operated cylinder engaged between the support and the carriage. This feature allows the angle of the die and punch to be adjusted for the size and type of fowl being denecked.

In an arrangement wherein a succession of the birds are suspended by holders of the type described in the above-cited patent, the carriage is provided with a guide extending at an angle upstream from the die so as to catch the hanging neck, lift it, and allow it to slide into the notch. Thus this guide automatically fits the pendant neck to the die as the bird is stepped into position.

In order to aid subsequent removal of the bird's wings, the apparatus is provided with a pair of knives carried on the die and displaceable into a position engaged in the back of the bird and a fluid-operated cylinder engaged with the knives for advancing same into the back of the bird generally as the punch is passed through the die. These cuts are positioned to sever the ligaments at the base of the wings so same can subsequently be easily neatly torn off the body.

The method according to this invention therefore comprises the steps of first detecting the presence of the bird with its neck engaged in the notch, then automatically advancing the carriage backward to press the die against the bird at the base of the neck thereof once the bird is detected. The carriage is then pushed backward to press the die against the bird at the base of the neck thereof and to align the knives with the back of the bird. Then generally simultaneously the punch is pushed down through the die to sever the neck from the bird and the knives are raised into the back of the bird and finally generally simultaneously the punch is raised from the die and the knives are lowered.

DESCRIPTION OF THE DRAWING

The above and other objects, features, and advantages will become more readily apparent from the following, reference being made to the accompanying drawing in which.

SPECIFIC DESCRIPTION

Figure 3:
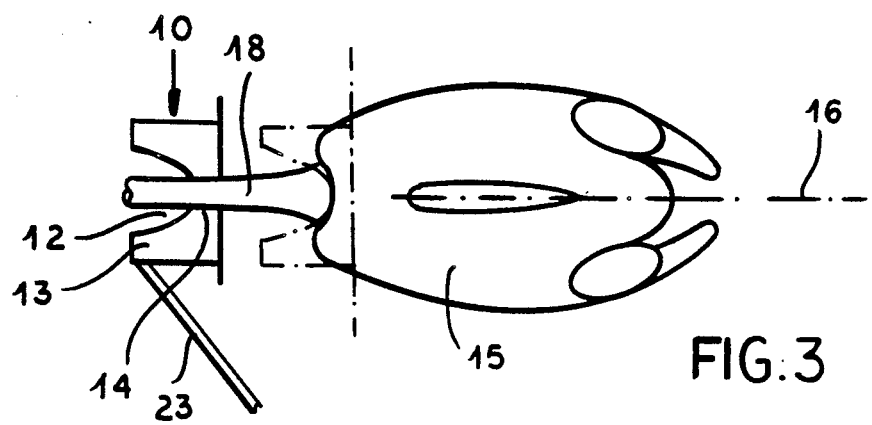
FIGS. 3 and 4 are top views of the apparatus in the retracted and advanced positions of FIGS. 1 and 2, respectively.

The apparatus according to the instant invention has a stationary base 2 carrying a pivot 3 extending horizontally and carrying a support frame 4. A small hydraulic or pneumatic cylinder 5 operated by a controller shown schematically at 21 can pivot the support 4 on the base 2 about the horizontal axis of the pivot 3. A horizontal guide 6 extending in a plane perpendicular to the pivot 3 supports a carriage 7 displaceable along this guide 6 by means of a hydraulic cylinder 8 itself associated with a pressure detector 9 connected to the controller 21. This carriage 7 supports a die 10 formed with a notch 12 shown in FIGS. 3 and 4 and itself defined by a pair of arms 13 and a base 14. The die 10 is flat and extends at an acute angle, here equal to about 45°, to the horizontal.

A gutted turkey body 15 supported on a holder shown schematically at 16 and corresponding to the arrangement described in the above-cited U.S. patent is displaced in a direction parallel to the pivot 3 in steps past the station defined by the apparatus according to this invention. This carcass 15 is positioned with its back 17 horizontal and downward and its neck 18 hanging on the side toward the denecking machine in accordance with the invention.

The carriage 7 also has a post 19 supporting a punch 20 of a shape complementary to that of the notch 12. A ram 22 operated through the notch 12 of the punch 10. In addition the carriage 7 is provided with a wire guide 23 that extends downward and outward at an angle from the die 10 so as to catch the pendant neck of the bird 15 upstream of the denecking machine as indicated in dot-dash lines in FIG. 1 and guided into a position hanging over the die 10 as seen in solid lines in FIG. 1. The controller 21 is connected to a bird detector carried on the carriage 7 to detect the presence of a neck 18 in the die 10.

Furthermore according to this invention a pair of upwardly movable and pointed knives 24 are provided on the carriage 7 under the control of a cylinder 25 operated by the controller 21. These knives serve to make incisions in the back 17 of the bird 15 to facilitate subsequent removal of the wings as described in copending U.S. patent application No. 464,515 filed Jan. 12, 1990.

Figure 1:
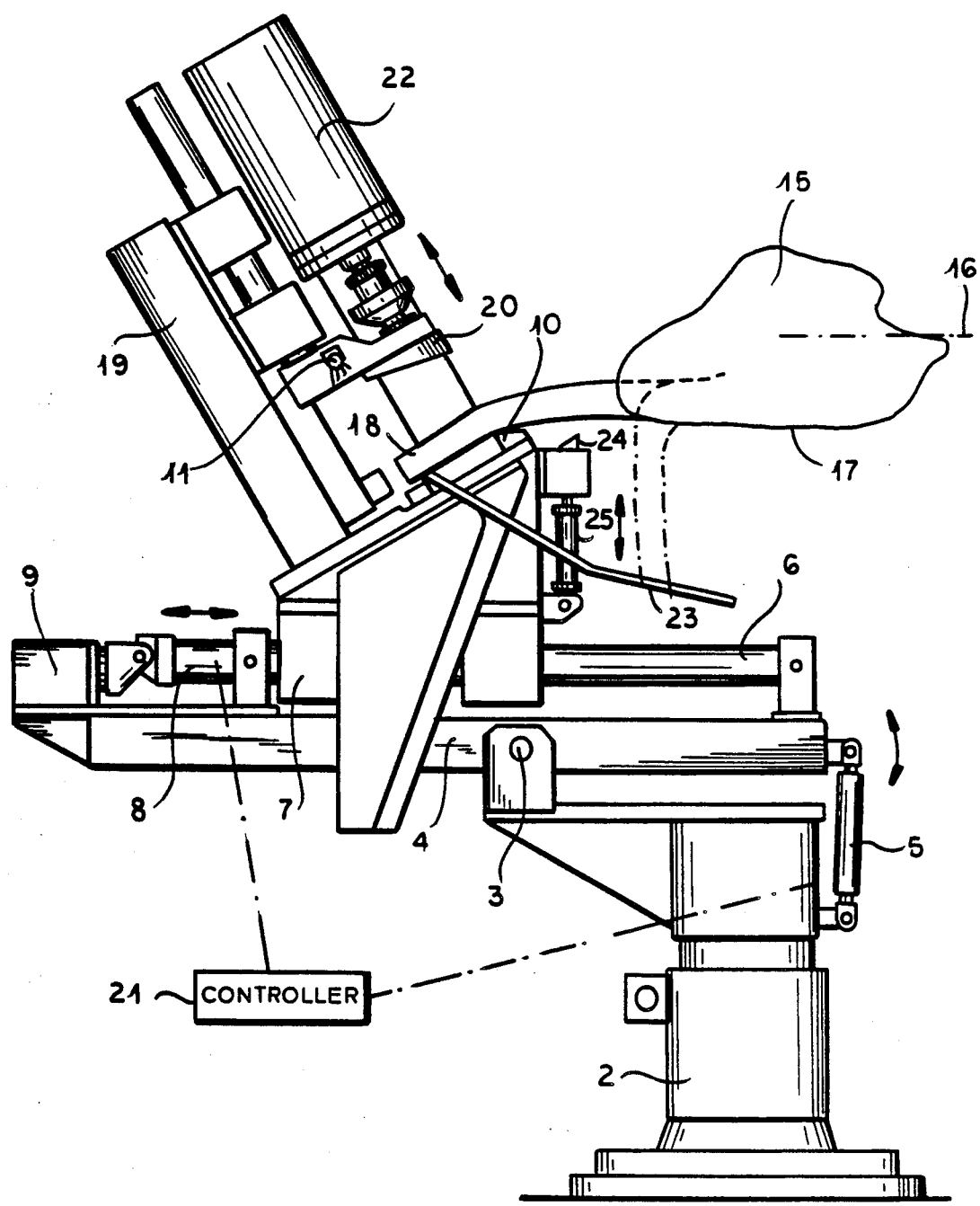
FIG. 1 is a partly diagrammatic side view of the apparatus according to this invention.

The device described above operates as follows:

To start with as seen in FIG. 1 the die 20 is in its uppermost position, the knives 24 are all the way down, and the carriage 7 is shifted all the way forward, that is to the left in FIG. 1. Thus, as the bird 15 moves downstream in a direction perpendicular to the plane of the view of FIG. 1, the neck 18 will be caught by the guide 23 and pushed up so that it lies over the notch 12 of the die 10.

Figure 2:
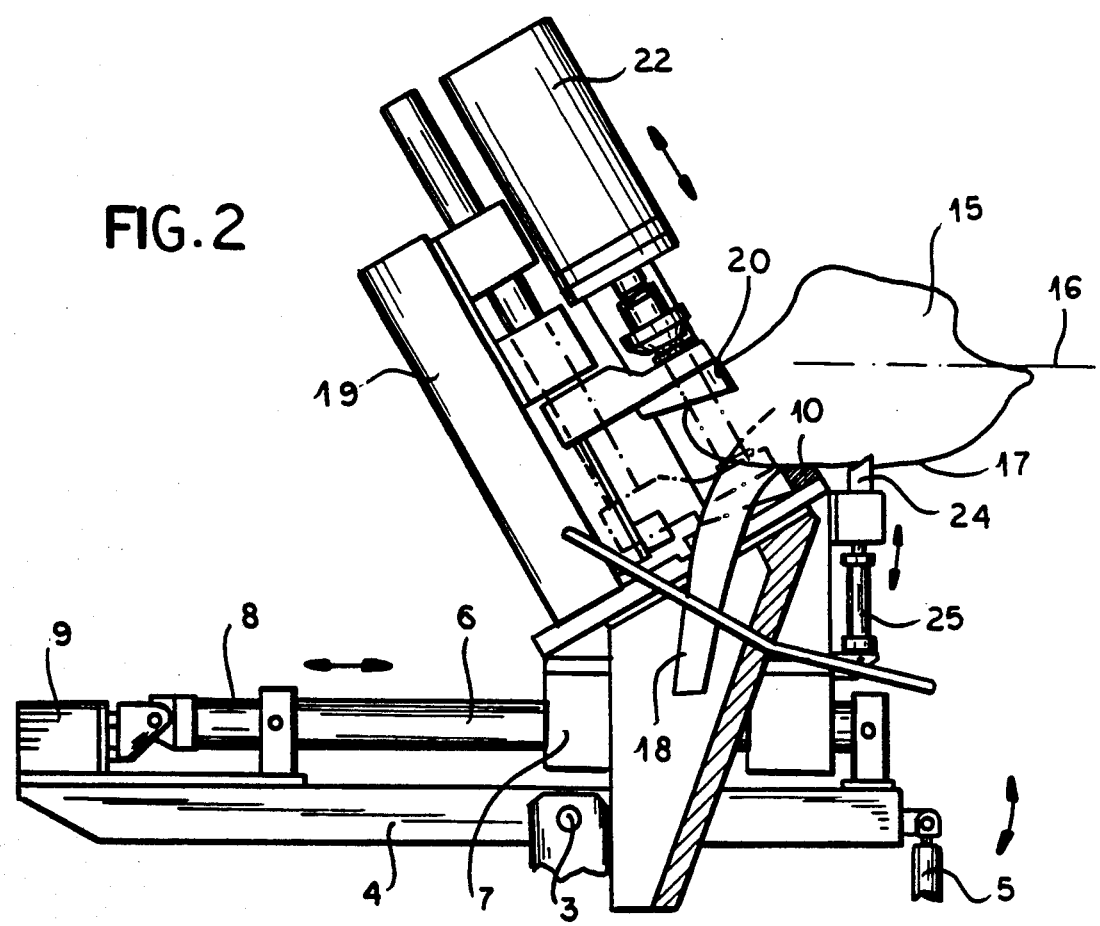
FIG. 2 is a side view of a portion of the apparatus in another position.

Once thus positioned the bird 15 stops moving and the cylinder 8 pushes the entire carriage 7 backward to the position of FIG. 2, until the pressure sensor 8 indicates that the die 10 is pressing against the bird 15 with a desired firm but not overly strong force. This shifting corresponds to the movement from the solid line to the dot-dash line position of the die shown in FIG. 3.

Figure 4:
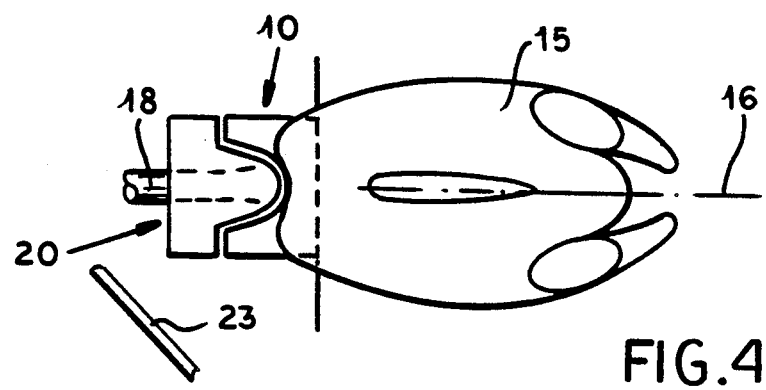

Then the die 20 is pushed downward and generally simultaneously the cylinder 25 pushes the knives 24 upward. This severs the neck 18 at its very base and forms two deep cuts adjacent the coracoids in the back 17 of the bird 15. The interfit of the punch 20 and die 10 is shown in FIG. 4.

This action completely severs the neck 18 at its base and cuts the ligaments at the bases of the wings of the bird 15. Thereafter the punch 20 and knives 24 are retracted and the bird is stepped downstream to the neck treatment station.

The apparatus according to this invention thus is normally used as the furthest upstream part of a production-line operation that cuts up turkey carcasses or the like into separate pieces.

We claim:

1. An apparatus for denecking a bird, the apparatus comprising:
   a generally stationary support;
   means for holding the bird to be dewinged stationarily adjacent the support;
   a generally U-shaped die adjacent the support and having a forwardly open notch in which a neck of the bird in the holding means is positioned;
   a punch complementary to the notch and engageable therethrough; and
   means for pushing the punch through the notch and thereby cutting off the neck positioned in the notch.

2. The denecking apparatus defined in claim 1 wherein the holding means holds the bird in a supine position with its neck draped over the die and hanging down through the notch thereof, the die being generally flat and having a pair of arms defining the notch, the notch having a base lying between the arms and the arms extending downward at an acute angle to the horizontal from the base.

3. The denecking apparatus defined in claim 1 wherein the holding means holds the bird stationarily in a supine position with its neck extending over the die and engaged in the notch thereof, the apparatus further comprising:
   a carriage carrying the die, punch, and means and displaceable horizontally on the support forward away and backward toward the bird; and
   means for displacing the carriage backward toward the bird and thereby pressing the die backward against the bird at a base of the neck thereof.

4. The denecking apparatus defined in claim 3 wherein the displacing means includes control means for detecting the pressure with which the die is engaging the bird and for stopping backward displacement of the die toward the bird when the pressure exceeds a predetermined limit.

5. The denecking apparatus defined in claim 3 wherein the carriage is pivotal about an axis transverse to the direction of displacement of the carriage, the apparatus further comprising:
   a fluid-operated cylinder engaged between the support and the carriage for tipping the carriage about the transverse axis.

6. The denecking apparatus defined in claim 1 wherein the holding means displaces the bird downstream in a supine position with its neck hanging downward and crosswise of the notch into a position with the neck aligned with the notch, the apparatus further comprising:

a guide extending at an angle upstream from the die so as to catch the hanging neck, lift it, and allow it to slide into the notch.

7. The denecking apparatus defined in claim 1 wherein the holding means holds the bird stationarily in a supine position with its neck extending over the die and engaged in the notch thereof, the apparatus further comprising:

a pair of knives carried on the die and displaceable into a position engaged in the back of the bird; and a fluid-operated cylinder engaged with the knives for advancing same into the back of the bird generally as the punch is passed through the die.

8. An apparatus for a denecking a bird, the apparatus comprising:

a stationary support;

a carriage displaceable horizontally forward and backward on the support;

a generally U-shaped die fixed on the carriage and having a forwardly open notch in which a bird neck is positioned;

a punch complementary to the notch and engageable therethrough;

means for holding the bird stationarily in a supine position with its neck extending over the die and engaged in the notch thereof;

a pair of knives carried on the die and displaceable into a position engaged in the back of the bird;

control means for sequentially detecting the presence of the bird with its neck engaged in the notch, advancing the carriage backward to press the die against the bird at the base of the neck thereof once the bird is detected, pushing the carriage backward to press the die against the bird at the base of the neck thereof and to align the knives with the back of the bird, generally simultaneously passing the punch down through the die to sever the neck from the bird and raising the knives into the back of the bird, and generally simultaneously raising the punch from the die and lowering the knives.

9. A method of operating a denecking apparatus comprising:

a stationary support;

a carriage displaceable horizontally forward and backward on the support;

a generally U-shaped die fixed on the carriage and having a forwardly open notch in which a bird neck is positioned;

a punch complementary to the notch and engageable therethrough;

means for holding the bird stationarily in a supine position with its neck extending over the die and engaged in the notch thereof; and a pair of knives carried on the die and displaceable into a position engaged in the back of the bird; the method comprising the steps of sequentially:

(a) detecting the presence of the bird with its neck engaged in the notch;

(b) advancing the carriage backward to press the die against the bird at the base of the neck thereof once the bird is detected;

(c) pushing the carriage backward to press the die against the bird at the base of the neck thereof and to align the knives with the back of the bird;

(d) generally simultaneously passing the punch down through the die to sever the neck from the bird and raising the knives into the back of the bird; and (e) generally simultaneously raising the punch from the die and lowering the knives.

* * * * *